Figure 1:
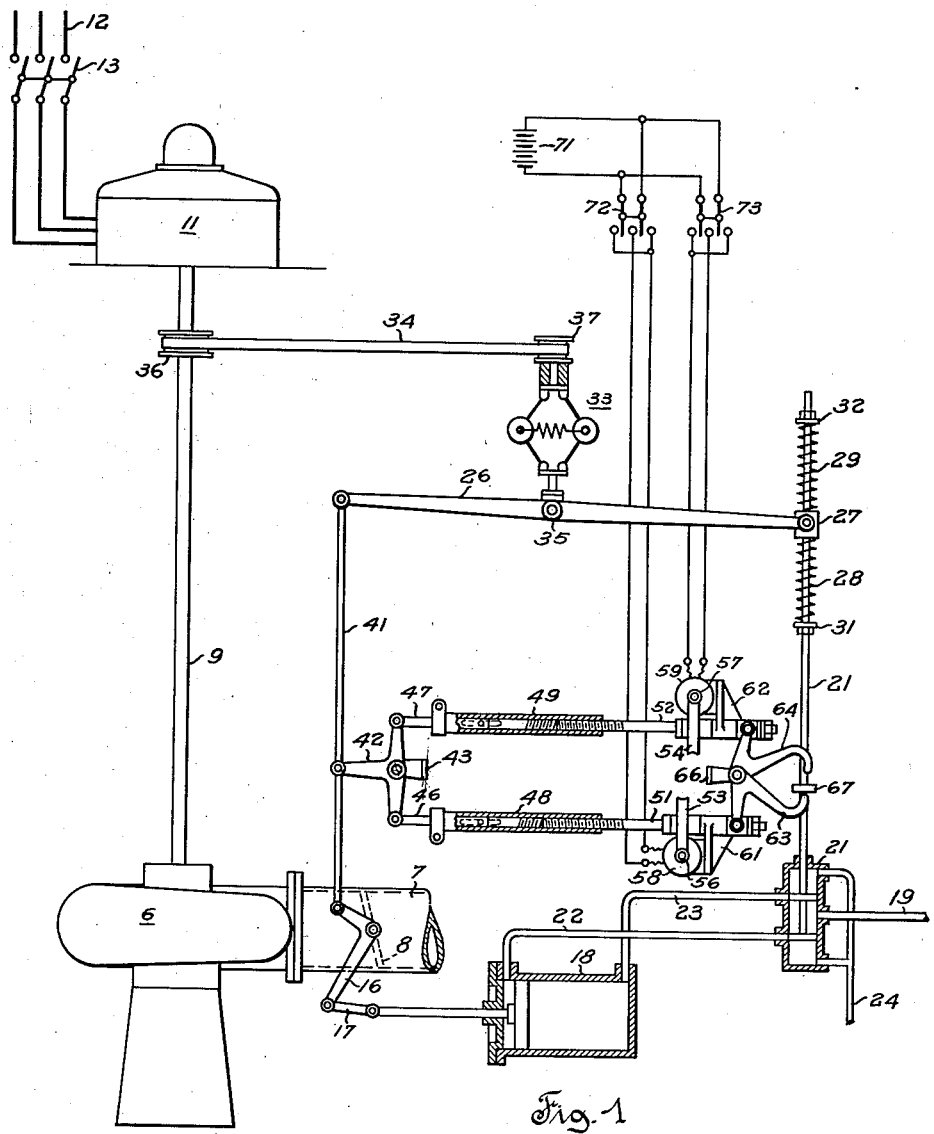

Jan. 12, 1937.  A. PFAU  2,067,460

CONTROL SYSTEM

Filed Sept. 14, 1935

Inventor
A. Pfau
by G. P. DeVein
Attorney

Patented Jan. 12, 1937

2,067,460

UNITED STATES PATENT OFFICE 2,067,460

CONTROL SYSTEM

Arnold Pfau, Milwaukee, Wis., assignor to Allis-Chalmers Manufacturing Company, Milwaukee, Wis., a corporation of Delaware Application September 14, 1935, Serial No. 40,618

8 Claims. (Cl. 137—158)

This invention relates to means for controlling prime movers and more particularly to governors of the flyball actuated type in which the flyballs are driven either directly or indirectly dependent on the speed of the prime mover and which controls the admission of operating fluid to such prime mover.

U. S. Letters Patent 1,090,520 issued March 17, 1914 to John E. Englesson, disclose a governor for a prime mover unit in which the governor is provided with a device which limits the maximum opening of the gate or valve controlling the admission of operating fluid to the unit and which has been termed a maximum power limiting device. Such device therefore limits the load which may be imposed on a unit controlled thereby and keeps the output of the unit within predetermined upper limits as well as being of assistance in reducing hunting of the unit due to unfavorable penstock conditions when the device is applied to the governing system of a hydraulic turbine.

Such device limiting the maximum gate opening is, however, ineffective to limit the minimum gate opening and thus to limit the operation of the governor in such manner as to keep the prime mover under a desired minimum output regardless of line conditions. In addition to such device, means may be also provided, when the governor controls a hydraulic turbine, to avoid complete stoppage of the water column and thus to prevent excessive pressure rises within the penstock which might rupture the penstock or cause other damage to the unit. Such means may be termed a minimum load limiting device to distinguish from the maximum load limiting device disclosed in the above identified patent.

The cooperation of a maximum and a minimum load limiting device permits the attainment of many advantages not obtainable with either of such devices when used separately. Thus, cooperative action of both devices, by limiting the range of governor action, keeps the prime mover in operation within the most efficient limits for such operation and reduces hunting of the unit due to any condition. The joint action of such devices also allows the unit to be kept at the proper speed for connection with an electric power line supplied from other generating units, thus keeping units controlled by such joint action, available as a standby for use in providing power for peak loads. When a governor is provided with both devices, such governor is most effective in controlling a hydraulic turbine to utilize the available flow or storage of a stream when such utilization is desired.

It is therefore among the objects of the present invention to provide a governor for prime movers with a plurality of means cooperating to retain the operation of the prime mover within the limits in which such prime mover is most efficient.

Another object of the invention is to provide a governor for prime movers with a plurality of means cooperating to reduce hunting of the prime mover.

Another object of the invention is to provide a governor for prime movers with a plurality of means cooperating to allow maintenance of the unit at such speed as to keep an electric generator operated thereby in synchronism with an electric power line supplied with power from other units connected therewith.

Another object of the invention is to provide a governor for prime movers with a plurality of means cooperating to utilize in the best manner possible, the available flow or storage of a stream flowing to a hydraulic turbine controlled by the governor.

Another object of the invention is to provide a governor for prime movers with means limiting the minimum load, at which the prime mover may operate, by limitation of the degree of closure of the gate or valve controlling the flow of operating fluid to the prime mover.

Another object of the invention is to provide a governor for hydraulic turbines in which means are provided to avoid complete stoppage of movement of the water column to the turbine and thus to limit pressure rises within the penstock.

Figure 2:
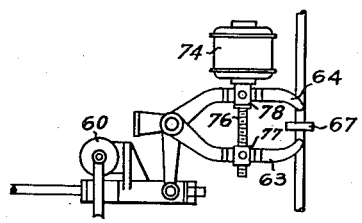

Objects and advantages other than those above set forth will be apparent from the following description when read in connection with the accompanying drawing, in which:

Fig. 1 diagrammatically illustrates one embodiment of the invention shown as applied to a hydraulic turbine operating an electric generator and in which the various portions of the governor and of the governing system are shown in diagrammatic form to facilitate comprehension thereof; and Fig. 2 is a partial view of a modified embodiment of a portion of the construction illustrated in Fig. 1.

Referring more specifically to the drawing by characters of reference, reference numeral 6 designates a prime mover shown herein as a hydraulic turbine to which operating fluid is supplied by way of a conduit or penstock 7. The penstock 7 contains a gate or valve 8 herein shown as being in the form of a wicket forming a portion of a valve of the well known butterfly type. It is to be understood that any other type of prime mover may be employed and that any other type of gate or valve suitable for control of the flow of operating fluid employed may also be used. The shaft 9 of the turbine is connected with the shaft of an electric current generator generally designated at 11 and arranged to be connected with a suitable electric power line 12 by means of an electric switch 13.

The valve 8 is connected with a bell crank lever 16, one end of which is connected through a link 17 with any suitable type of servo-motor, the valve being herein shown as being actuated by the piston rod of a fluid pressure operated servo-motor 18. Fluid pressure may be supplied to either side of the servo-motor piston from a suitable source (not shown) through a pipe 19, a valve 21 and supply pipes 22 and 23, the fluid discharging from the servo-motor through pipes 22 and 23, the valve 21, and the discharge pipe 24. The valve is operated by a floating lever 26 movably connected with the stem of valve 21 by a swivel 27 movably mounted on the valve stem between springs 28 and 29 abutting against a collar 31 on the stem and against a nut 32 threaded on the stem. Floating lever 26 is connected at a point intermediate its ends with flyballs 33 of the usual construction and therefore somewhat diagrammatically shown and which are driven by suitable means to be responsive to the speed of the turbine, such means being herein illustrated as a belt 34 and pulleys 36 and 37, the pulley 36 being mounted on the turbine shaft 9 or on other suitable speed responsive portions of the structure.

The end of the floating lever 26, which has not yet been accounted for, is connected with a rod 41, the connection of which will be hereinafter described.

A double armed bell crank 42 is pivotally mounted on a stationary pivot 43 and is also pivotally connected with the rod 41. The ends of the bell crank 42 are severally pivotally connected with rods 46 and 47 to which are severally attached tubes 48 and 49 by means of a pin and slot or any other connection to give a splined effect. The position of the tubes on the rod may be fixed by means of clamps on the ends of the tubes. The tubes are at least partially interiorly threaded to severally receive threads on rods 51 and 52 which have mounted thereon worm wheels 53 and 54, respectively, which engage with worms 56 and 57 severally secured to the spindles of motors 58 and 59. The motors are mounted on rods 51 and 52, respectively, by means of brackets 61 and 62 and therefore move with such rods. The rod 51 is pivotally connected with a contact finger or fork 63 in the form of a bell crank and rod 52 is pivotally connected with a similar contact finger or fork 64 likewise in the form of a bell crank, both fingers 63 and 64 being pivotally mounted by means of a common pivot 66 on a stationary portion of the governor structure. The ends of the two fingers are so shaped as to be spaced from each other and as to extend on either side of a collar 67 secured on the stem of valve 21. The motors are preferably operable from a source of direct electric current such as the battery 71 and are hence severally reversible merely by reversing switches 72 and 73 thus operating fingers 63 and 64 respectively.

In the modification illustrated in Fig. 2 the fingers 63 and 64 are combined into a single mechanism which is operated by a single rod adjustable by a single motor such as the motor 60. The spacing between the fingers is then preferably made adjustable as shown by means of a motor 74 with a threaded spindle 76 passing through threaded nuts 77 and 78 mounted on the fingers 63 and 64. The motor 74 may then be connected to the switch 73 and may be operated thereby in the same manner as the motor 59 is operated.

The several elements of the system disclosed in Fig. 1 are shown in the position assumed thereby when the generator 11 is disconnected from the line 12, that is, with the switch 13 open and when the turbine 6 is at standstill. The gate 8 controls admission of operating fluid to the turbine and is, accordingly, closed, the piston of the servo-motor 18 operating the gate is in the midposition, and the valve 21 which controls admission of fluid to the servo-motor is in its neutral position, and therefore does not admit fluid to either side of the servo-motor piston. The collar 67 on the stem of the valve 21 is pressed against the finger 63 and the spring 29 is expanded while the spring 28 is compressed.

In starting the unit from a standstill position illustrated and described above, switch 72 is closed to the position in which the motor 58 will thread rod 51 into tube 48, thus swinging finger 63 clockwise away from the collar 67. Such closure of the switch may be only intermittent and may be repeated as often as required to produce the desired degree of movement of the finger 63. As the finger 63 moves away from the valve stem collar 67, spring 28 expands and the collar 67 follows the downward movement of the finger 63. Valve 21 is then moved downwardly to admit pressure to the left side of the piston of the servo-motor 18, which causes gate 8 to admit operating fluid to the turbine 6. Movement of the gate 8 pulls down on the rod 41 which moves the floating lever 26 about pivot 35 as a fulcrum thereby raising swivel 27 and restoring valve 21 to the mid-position. Such downward movement of rod 41 also causes crank 42 and rod 46, tube 48 and rod 51 to press finger 63 against the collar 67 thus again slightly compressing the spring 28. Admission of operating fluid to the turbine through the gate 8 causes operation of the turbine which produces rotation of the flyballs 33 which tend to lift the lever 26, thus slightly compressing the spring 29 and allowing the spring 28 to expand. The effect of springs 28 and 29 cooperating with the effect of flyballs 33 is thus to tend to lift the valve 21 to cause closing of the gate 8. Inasmuch as the turbine 6 is not yet, however, up to the speed at which the generator may be connected to the line 12, the momentary closure of switch 72 and hence the sequence of actions resulting therefrom, as described above, is repeated as often as required to bring the turbine up to its normal operating speed.

At normal running speed, switches 72 and 73 are actuated to space fingers 64 and 63 from the collar 67 by the amounts previously determined as permitting operation of the unit by the flyballs within the range at which the unit is most efficient. Springs 28 and 29 are then in equilibrium condition and since the valve 21 has no external forces acting upon it, it therefore moves into its neutral position. Changes in the load and hence variations in the speed of the turbine now so act on the flyballs 33 as to cause movement of the floating lever 26 which movement acts on spring 28 or 29 to move the valve 21 from its neutral position to open or to close the gate 8 dependent on whether the speed variations are decreases or increases. Such movements of the gate 8 are, however, limited to a predetermined opening thereof by finger 63 which therefore limits the predetermined maximum load which may be put on the unit and are limited to predetermined closing thereof by finger 64 which therefore limits the predetermined minimum load below which the load on the unit may not be reduced.

If an excessive load increase and hence a speed decrease should occur, during operation of the unit, the flyballs 33 will contract considerably and swivel 27 will be materially depressed, thereby tending to compress the spring 28. Collar 67 is then forced against finger 63 which would tend to move valve 21 in a direction to admit more fluid pressure against the left face of the piston of servo-motor 18 which then tends to open gate 8 to a greater extent than such gate was opened previously. Such movement of the valve 21, the servo-motor 18 and the gate 8 is, however, limited or prevented by the position of the finger 63. Any further speed decreases are therefore without effect on the gate opening of the unit which therefore continues to deliver the maximum output according to the setting of finger 63. Any continued decrease in speed merely results in further compression of spring 28 without change in the position of the collar 67, valve 21, the piston of servo-motor 18 or the gate 8.

When an excessive load decrease and hence a corresponding speed increase occurs, whether sudden or not, the operation described immediately above takes place in the reverse direction and the spring 28 is expanded.

Assuming that the unit is in operation and that such operation is to be interrupted, switch 72 is closed in the reverse direction from that in which it was previously moved and thus produces reversal of the direction of rotation of the motor 58 from that previously described thus threading rod 51 out of tube 48 and rotating finger 63 counterclockwise against collar 67 which lifts valve 21 to cause flow of fluid pressure into the right hand portion of the servo-motor cylinder, thereby moving gate 8 into the closed position. Lifting of the valve 21 compresses the spring 28 and closing of the gate 8 raises the rod 41 which places the floating lever 26 in the position shown in the drawing. Valve 21 remains in the raised position as long as the finger 63 is kept in contact with the valve stem collar 67 and the valve may then remain in the raised position to hold the gate 8 positively in its closed position. However, if so desired, motor 59 may be reversed only slightly to rotate finger 64 clockwise and to permit valve 21 to return to the neutral position.

The operation of the modification illustrated in Fig. 2 is similar to that above described for Fig. 1 in that the motor 60 performs the functions described above excepting that motor 60 now controls both fingers 63 and 64 and the motor 74 then merely performs the function of securing proper spacing between the fingers 63 and 64 when the turbine unit is in operation.

It will thus be readily understood from the above description when read in connection with the accompanying drawing that the present invention provides means for starting a prime mover from standstill to a predetermined speed without the necessity for using compensating dashpots or synchronizing attachments heretofore considered indispensable. Such means also provide a maximum gate opening device which limits the predetermined load which may be put on the prime mover and greatly reduces hunting of the unit due to penstock complications or due to any other reason. The invention also provides means which avoid excessive water hammer due to complete interruption of the flow of operating fluid to the prime mover and provides a minimum gate closing device which limits the output of the unit to a predetermined minimum. Cooperation of the two devices, with a proper setting thereof, keeps the prime mover operating within its most efficient range when under load and also best utilizes available stream flow or storage when the prime mover is a hydraulic turbine. Such cooperation reduces hunting of the unit, particularly when the unit is being used for standby service.

Although but a few embodiments of the present invention have been illustrated and described, it will be apparent to those skilled in the art that various changes and modifications may be made therein without departing from the scope of the present invention or from the spirit of the accompanying claims.

It is claimed and desired to secure by Letters Patent:

1. In a system for controlling the acceleration and deceleration of a prime mover to and from a desired speed and for retaining the prime mover speed within predetermined limits, a gate controlling the flow of operating fluid to the prime mover, a servo-motor for operating said gate, means responsive to the speed of the prime mover for controlling the operation of said servo-motor, and means cooperating to control both the amount and the rate of acceleration and deceleration of the prime mover independently of the operation of said speed responsive means.

2. In a system for controlling the acceleration and deceleration of a prime mover to and from a desired speed and for retaining the prime mover speed within predetermined limits, a gate controlling the flow of operating fluid to the prime mover, a servo-motor for operating said gate, means responsive to the speed of the prime mover for controlling the operation of said servo-motor, means for controlling the effect of said speed responsive means to limit the degree and the rate of opening of said gate, and means controlling the effect of said speed responsive means to limit the degree and the rate of closing of said gate.

3. In a system for controlling the acceleration and deceleration of a prime mover to and from a desired speed and for retaining the prime mover speed within predetermined limits, a gate controlling the flow of operating fluid to the prime mover, a servo-motor for operating said gate, means responsive to the speed of the prime mover for controlling the operation of said servo-motor, means for limiting the accelerating effect of said speed responsive means, means for varying the effect of said limiting means, means cooperating with said limiting means for limiting the decelerating effect of said speed responsive means, and means for varying the effect of the second said limiting means.

4. In a system for controlling the deceleration of a prime mover from a desired speed and for retaining the prime mover speed within predetermined limits, a gate controlling the flow of operating fluid to the prime mover, a servo-motor for operating said gate, means responsive to the speed of the prime mover for controlling the operation of said servo-motor, means for limiting the operation of said servo-motor in a direction to close said gate, and means for varying the limits imposed by the second said means on the system.

5. In a system for controlling the deceleration of a prime mover from a desired speed and for retaining the prime mover speed within predetermined limits, a gate controlling the flow of operating fluid to the prime mover, a servo-motor for operating said gate, means responsive to the speed of the prime mover for controlling the operation of said servo-motor, means adjustably interconnecting said gate and said speed responsive means to limit the degree of closing of said gate regardless of the action of said speed responsive means, and remotely controllable means to vary the adjustment of the last said means.

6. In a system for controlling the starting and operation of a prime mover, a gate controlling the flow of operating fluid to the prime mover, a fluid pressure operated servo-motor for operating said gate, a valve controlling the application of fluid pressure to said servo-motor, a floating lever connected with said gate and with said valve to control operation thereof, means responsive to the speed of the prime mover and connected with said lever to vary the position thereof, a plurality of severally adjustable rods connected with said gate, a plurality of fingers movably connected with said rods and movable into engagement with the stem of the valve, a fixed pivot common to said fingers, and a plurality of means for severally changing the adjustments of said rods to actuate said fingers and to thereby limit the range of movement of said valve.

7. In a system for controlling the starting and operation of a prime mover, a gate controlling the flow of operating fluid to the prime mover, a fluid pressure operated servo-motor for operating said gate, a valve controlling the application of fluid pressure to said servo-motor, a floating lever connected with said gate and with said valve to control operation thereof, means responsive to the speed of the prime mover and connected with said lever to vary the position thereof, a plurality of adjustable interconnected rods jointly connected with said gate, a plurality of movable fingers severally mounted on said rods and movable into engagement with the stem of said valve, and a plurality of remotely operable motors severally connected with said rods to vary the relative positions of said fingers and to vary the positions of said fingers relative to a point on the stem of said valve to thereby control the maximum and the minimum opening of said gate.

8. In a system for controlling both the acceleration and the deceleration of a prime mover to and from a desired speed and for retaining the prime mover speed within predetermined limits, a gate controlling the flow of operating fluid to the prime mover, a servo-motor for operating said gate, means responsive to the speed of the prime mover for controlling the operation of said servo-motor, means adjustably interconnecting said gate and said speed responsive means to limit the maximum load to be carried by the prime mover, remotely controllable means to vary the adjustment of said maximum load limiting means, means interconnecting said gate and said speed responsive means to limit the minimum load to be carried by the prime mover, and remotely controllable means to vary the adjustment of said minimum load limiting means, the last four of said means being operable independently of said speed responsive means.

ARNOLD PFAU.